United States Patent [19]

Carey

[11] Patent Number: 6,078,994
[45] Date of Patent: Jun. 20, 2000

[54] SYSTEM FOR MAINTAINING A SHARED CACHE IN A MULTI-THREADED COMPUTER ENVIRONMENT

[75] Inventor: James E. Carey, Brookline, Mass.

[73] Assignee: Oracle Corporation, Redwood Shores, Calif.

[21] Appl. No.: 08/866,518

[22] Filed: May 30, 1997

[51] Int. Cl.[7] .................................................. G06F 12/12
[52] U.S. Cl. ............................ 711/133; 711/159; 702/206
[58] Field of Search ................................... 711/133, 134, 711/135, 136, 159, 160; 702/206

[56] References Cited

U.S. PATENT DOCUMENTS

| | | | |
|---|---|---|---|
| 4,975,833 | 12/1990 | Jinzaki .................................... | 364/200 |
| 5,179,702 | 1/1993 | Spix et al. ............................... | 395/364 |
| 5,297,269 | 3/1994 | Donaldson et al. ..................... | 395/425 |
| 5,345,588 | 9/1994 | Greenwood et al. ................... | 395/650 |
| 5,394,555 | 2/1995 | Hunter et al. ........................... | 395/800 |
| 5,414,840 | 5/1995 | Rengarajan et al. ................... | 395/600 |
| 5,459,862 | 10/1995 | Garliepp et al. ........................ | 395/600 |
| 5,475,858 | 12/1995 | Gupta et al. ............................ | 395/800 |
| 5,535,116 | 7/1996 | Gupta et al. ............................ | 364/134 |
| 5,566,315 | 10/1996 | Milillo et al. ........................... | 711/113 |
| 5,613,086 | 3/1997 | Frey et al. ............................... | 395/479 |
| 5,636,355 | 6/1997 | Ramakrishnan et al. ............... | 711/113 |
| 5,642,495 | 6/1997 | Ammann et al. ....................... | 395/480 |
| 5,684,993 | 11/1997 | Willman ................................. | 395/677 |
| 5,761,670 | 6/1998 | Joy ......................................... | 707/103 |
| 5,788,429 | 7/1998 | Sukegawa et al. ..................... | 711/129 |
| 5,860,101 | 1/1999 | Arimilli et al. ......................... | 711/121 |

FOREIGN PATENT DOCUMENTS

WO 95/25306 9/1995 WIPO .

OTHER PUBLICATIONS

Baylor, Sandra J., et al. "An Evaluation of Cache Coherence Protocols for MIN–Based Multiprocessors," *International Symposium on Shared Memory Multiprocessing*, pp 230–241 (Tokyo, Japan, Apr., 1991).

Li, K., "Shared Virtual Memory on Loosely Coupled Multiprocessors," YALEU/DCS/RR—492, Yale University, Department of Computer Science, pp. 1–209, (Sep. 1986).

Berson, A., *Client/Server Architecture*, Second Edition, McGraw–Hill Series on Computer Communications, (1996).

Chapter 4, "Server Specialization in the Client/Server Environment," pp. 99–131.

Chapter 16, "Technology and Advanced Applications of Data Warehousing," pp. 463–501.

*Primary Examiner*—Eddie P. Chan
*Assistant Examiner*—Kevin L. Ellis
*Attorney, Agent, or Firm*—Hamilton, Brook, Smith & Reynolds, P.C.

[57] ABSTRACT

In a multi-threaded computing environment, a shared cache system reduces the amount of redundant information stored in memory. A cache memory area provides both global readable data and private writable data to processing threads. A collection mechanism monitors the amount of cache memory available to the processing threads. In particular, a collector thread is executed when needed to reclaim least recently used cache memory.

105 Claims, 11 Drawing Sheets

SYSTEM FOR MAINTAINING A SHARED CACHE IN A MULTI-THREADED COMPUTER ENVIRONMENT

BACKGROUND

In a large scale computer system, such as a database management system (DBMS), it is important to be able to support a number of different users concurrently. Without such a capability, the system would be little more than a standalone computer. To implement multi-user support, several different processing models have been utilized. One model that has been used is the multi-processing model. In multi-processing, each time a new user requests access to the system, a separate process is started. This process is in essence a separate execution of the software. Once started, the process services all of the requests from the user that spawned it. Under the multi-processing model, each process has its own separate memory space for use in storing and processing data.

Multi-processing is effective for supporting multiple users concurrently; however, it has severe scalability limitations. This is due mainly to two factors. First, spawning and maintaining a process involves a significant amount of overhead. Because of the high cost, only a small number of processes can be maintained at any one time. Second, the same set of data, used by multiple processes, may be stored redundantly; once in each process' memory space. This redundancy can waste a significant amount of system resources.

To overcome some of the limitations of multi-processing, the multi-thread model was developed. According to the multi-thread model, there is only one execution of the software. That is, only one process is spawned. From this one process, multiple threads can be spawned to perform the work necessary to service user requests.

Multi-threading has several advantages over multi-processing. First, because only one process is spawned, overhead is kept to a minimum. It is true that each thread carries with it some overhead cost, but this cost is negligible when compared with the cost of maintaining an entire process. Because multi-threading significantly reduces system overhead, many more users can be supported. Another advantage of multi-threading is that it minimizes the redundant storage of data. Because all of the threads are part of the same process, all of the threads can share the same memory space. This in turn makes it easier to implement a shared cache.

With a shared cache, it is only necessary to store a set of data once. After the data is cached, all of the threads can access it. By reducing redundant storage of data, multi-threading makes more efficient use of system resources.

Implementing a shared cache gives rise to increased efficiencies. However, a shared cache is not without its disadvantages. One of the drawbacks of a shared cache is the possibility of deadlock. To elaborate, in most caching systems, users are allowed to obtain locks on selected entries in the cache. Once a lock is obtained on a cache entry, the entry typically cannot be changed by another user or flushed until the lock is released. In a shared cache, multiple users are accessing and possibly locking various entries in the cache. Because of this, there may be instances in which a first user waits for a lock owned by a second user to be released, while the second user is waiting for a lock owned by the first user to be released. In such an instance, there is deadlock. When deadlock occurs, useful work stops being performed. Because deadlock is an undesirable condition, a need exists for a mechanism for preventing the occurrence of deadlock conditions.

SUMMARY OF THE INVENTION

In accordance with a preferred embodiment of the invention, a shared memory structure is utilized to store data which is sharable between a plurality of users in a multi-threaded computing environment having a multi-dimensional database. In particular, a cache memory area on a server is used to store public, sharable data and private, non-sharable data. Consequently, there are public and private pages stored in memory. The private pages are those that are modifiable by a user and the public pages are those that are only readable by one or more users.

In accordance with one aspect of the invention, the cache memory area is maintained by a collector. In particular, the collector executes in response to a triggering event to reclaim cache memory blocks. The triggering event is preferably a minimum threshold level of free cache memory blocks which are maintained on a free list.

In a preferred embodiment of the invention, a computer having a plurality of cache memory blocks and executing instructions programmed to manage a cache memory area. Data is stored in a first subset of cache memory blocks and accessible by at least one data accessor, such as a user session. A list of free cache memory blocks is also stored in the computer. The free cache memory blocks are those cache memory blocks that are not included in the first subset of cache memory blocks. A collector task is executed in the computer in response to a triggering event, such as reaching a minimum threshold of free memory blocks. The threshold level can be detected from a data accessor. From the collector, cache memory blocks are reclaimed from the first subset of cache memory blocks to the list of free cache memory blocks by identifying a least-recently-used or another sufficiently old cache memory block. Execution of the collector is suspended in response to the reaching of a maximum threshold of free cache memory blocks.

In addition, modified cache memory blocks (i.e., private pages) that are unlocked can be periodically reclaimed by a flusher task. The flusher is preferably triggered by a periodic timer.

Preferably, the user sessions, collector task and flusher tasks are implemented as processing threads in a multi-threaded computing system. In particular, the computing system can include a plurality of processing units for executing the threads. However, aspects of the invention can also be applied to processes in a multi-process architecture. As such, the term data accessor will be understood to encompass any computing mechanism to access or manipulate data, including threads and processes.

By utilizing dedicated threads, any processing penalty encountered during the reclamation process is absorbed by the collector and flusher threads. Thus the session threads continue to operate normally, making the reclaiming of cache memory transparent to the users.

The above and other features of the invention, including various novel details of construction and combination of parts, will now be more particularly described with reference to the accompanying drawings and pointed out in the claims. It will be understood that the particular system for maintaining a shared cache embodying the invention is shown by way of illustration only and not as a limitation of the invention. The principles and features of this invention may be embodied in varied and numerous embodiments without departing from the scope of the invention.

DETAILED DESCRIPTION OF PREFERRED EMBODIMENTS OF THE INVENTION

Figure 1:
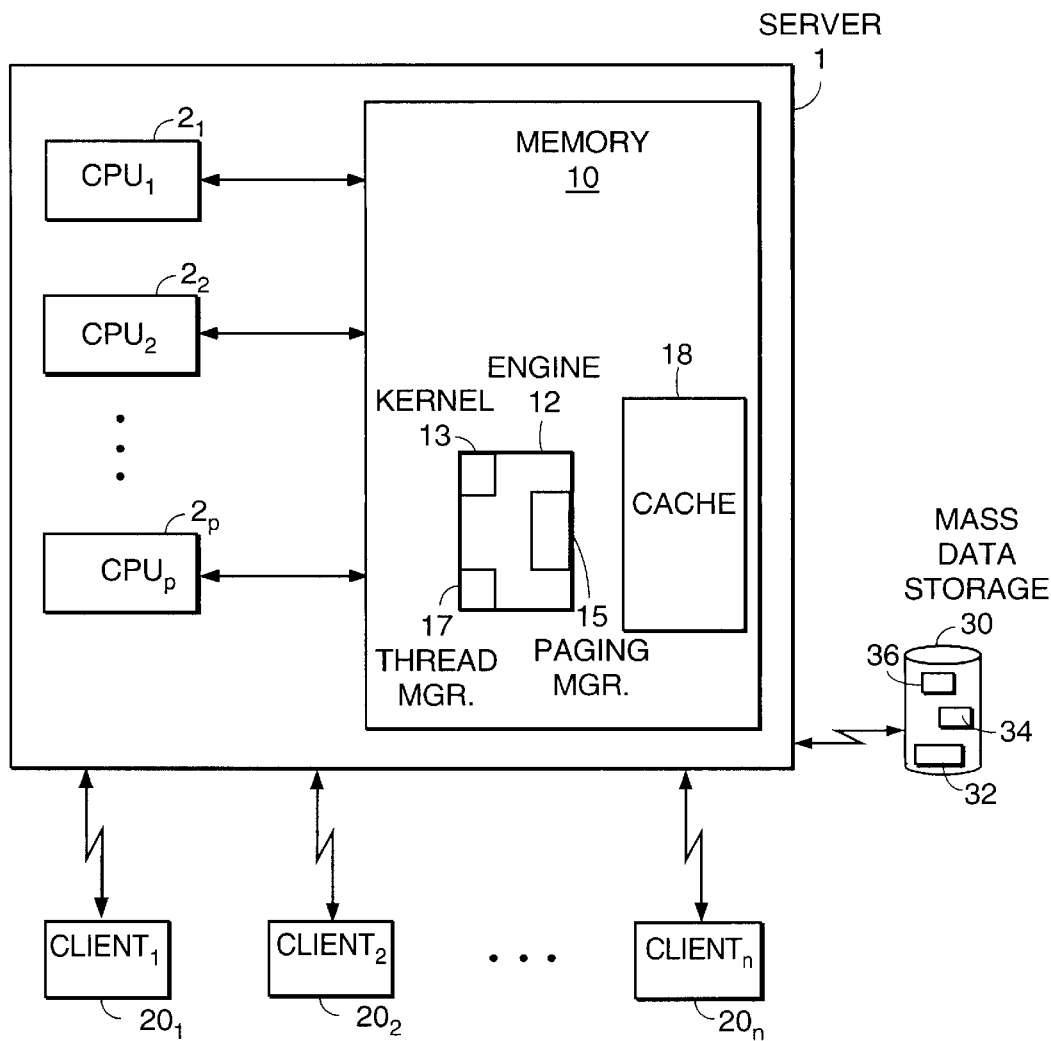
FIG. 1 is a schematic block diagram of an on-line analytical processing system embodying the invention.

FIG. 1 is a schematic block diagram of an on-line analytic processing (OLAP) system embodying the invention. A server 1 responds to requests from a plurality of client users $20_1, 20_2, \ldots, 20_n$. To satisfy client requests, the server 1 retrieves data from a data storage warehouse 30, which can include various databases, such as relational databases 32, multi-dimensional databases 34 and temporary databases 36 stored on disk.

The server 1 includes at least one central processing unit (CPU) $2_1, 2_2, \ldots, 2_p$. The CPUs 2 execute client or user sessions and system management processes to operate on data stored in memory 10, which includes an OLAP engine 12 and a cache memory 18. The OLAP engine 12 includes a kernel 13, a paging manager 15 and a thread manager 17. The user sessions preferably execute paging manager instructions, including page transfer functions 16, to manage pages in memory.

The user sessions and system management processes preferably include processing threads managed by the thread manager 17 in a multi-threaded OLAP engine 12. That is, user sessions can accomplish tasks by asynchronously executing processing threads. Embodiments of the invention preferably take the form of computer executable instructions embedded in a computer-readable format on a CD-ROM, floppy or hard disk, or another computer-readable distribution medium. These instructions are executed by one or more CPUs $2_1, 2_2, \ldots, 2_p$ to implement the OLAP engine 12. A particular embodiment of the invention is commercially available as Oracle Express Server, version 6.0, from Oracle Corporation.

Figure 2:
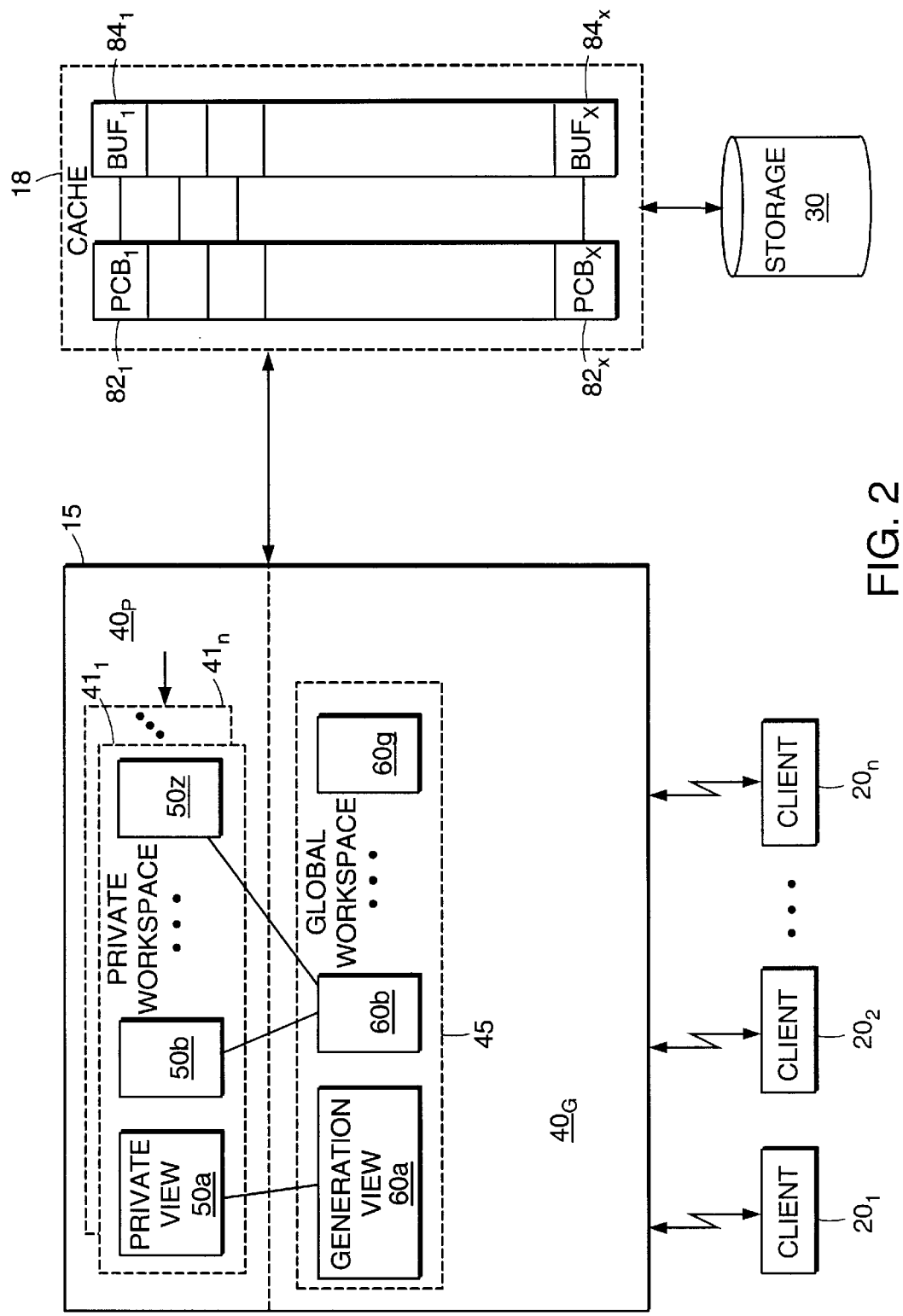
FIG. 2 is a schematic block diagram of a preferred page management system.

FIG. 2 is a schematic block diagram of a preferred page management system. The paging manager 15 receives page requests from the client users $20_1, 20_2, \ldots, 20_n$ and insures that current pages are retrieved from disk 30 and stored in the shared cache memory 18. The cache memory 18 can be global memory or memory assigned to the OLAP application by the server operating system.

The paging manager 15 includes a private memory section $40_P$ and a public memory section $40_G$. The private section $40_P$ can include a plurality of private workspaces $41_1, 41_2, \ldots, 41_n$. There is one private workspace 41 for each user session. A private workspace 41 includes private pagespace views $50a, 50b, \ldots, 50z$, which record information about writable pagespaces referenced by the current user session.

The public section $40_G$ is organized based on open databases. For ease of understanding, the system is illustrated as having one open database. However, it should be understood that there are generally a plurality of open databases being accessed by the client users. For each open database there is a public workspace 45 in the public memory section $40_G$ having, in general, a plurality of generational pagespace views $60a, 60b, \ldots, 60g$. Each private pagespace view 50 is associated with a particular generation of the database. For ease of description, preferred embodiments of the invention will be described with reference to a single database having a single generation in memory.

The cache memory 18 includes page buffers $84_1, 84_2, \ldots, 84_x$ each having an associated page control block (PCB) $82_1, 82_2, \ldots, 82_x$. Each page buffer 84 holds a page of data read from storage 30. In accordance with a preferred embodiment of the invention, the page buffers 84 each store data in blocks of 4K bytes, defined as a page. It should be understood that the page size can be chosen to be either less than or greater than 4K bytes. The page control blocks 82 include data fields used to control and access associated page buffers 84. The cache memory 18 is shared by the user sessions to store both public and private data.

It is important to note that there is no physical division between public and private data pages. That is, a particular page buffer 84 simply stores a page of data, which can be either public or private data. It is up to the OLAP engine 12 to logically separate public and private data pages. In particular, the OLAP engine 12 relies on the public workspace 45 and the private workspaces $41_1, \ldots, 41_n$ which include indexes to the appropriate page control blocks $82_1, \ldots, 82_x$.

Figure 3B:
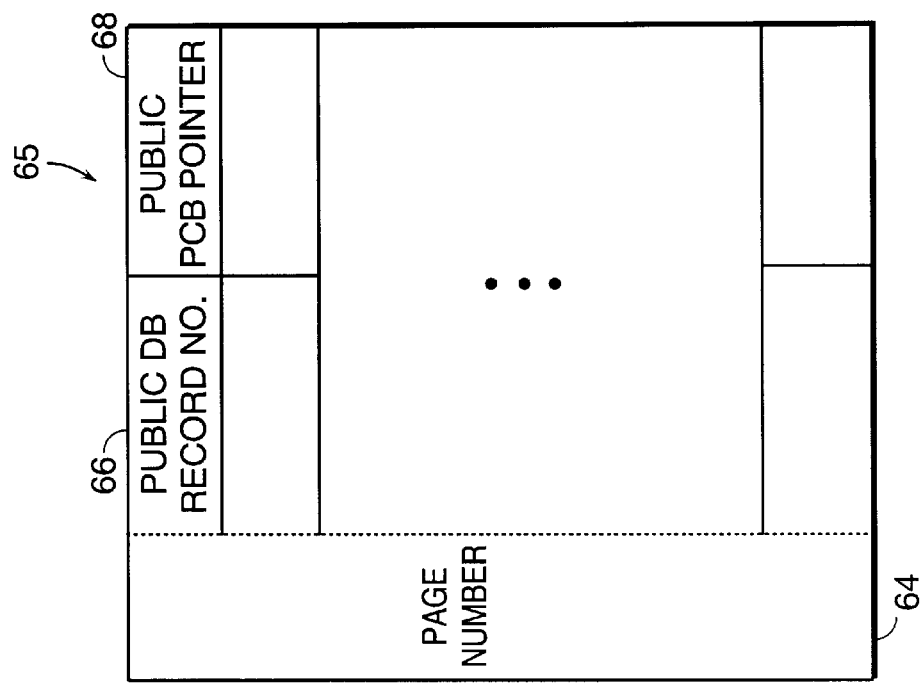
FIGS. 3A–3B are schematic block diagrams of a private workspace and a global workspace index structure, respectively.
Figure 3A:
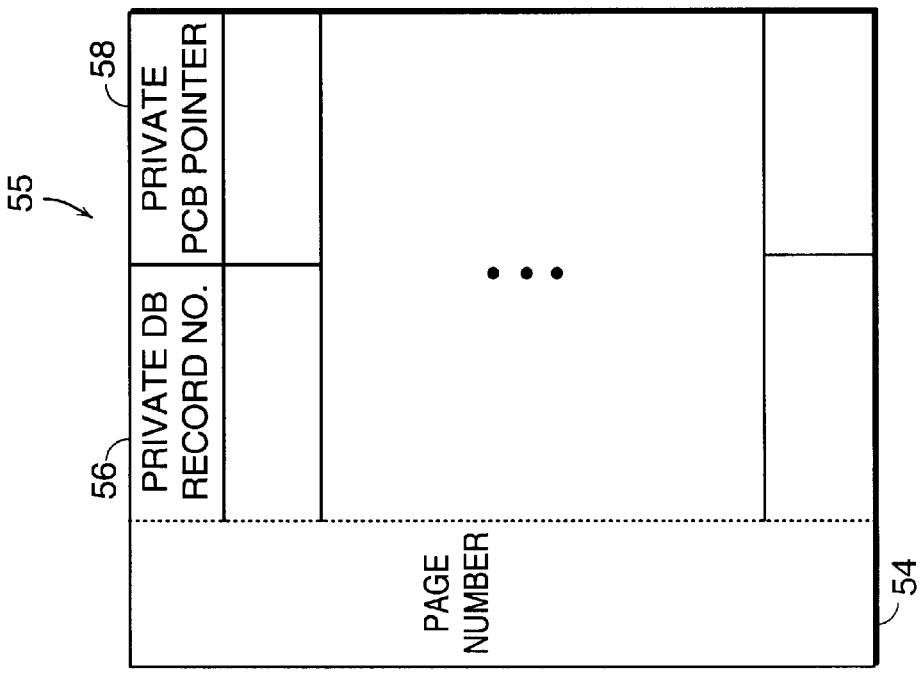

FIGS. 3A–3B are schematic block diagrams of a private workspace index structure 55 and a public workspace index structure 65, respectively. The index structures 55, 65 are included within a pagespace handle and are indexed by a page number 54, 64 within the associated pagespace. There is preferably one private index structure 55 stored in session memory for each pagespace per session. Similarly, there is one public index structure 65 for each open and sharable pagespace. In a particular preferred embodiment, the index structures 55, 65 are a B-tree, but other look-up structures can be substituted to meet particular objectives.

From the index structures 55, 65, a database record number 56, 66 and a page control block pointer 58, 68 are available if the page is within the respective view. If not null, the database record number 56, 66 identifies the record number in the database which holds the requested page. If the page is stored in the cache 18, the page control block pointer 58, 68 points to the page control block 82 associated with the page buffer 84 in which the referenced record is stored.

Figure 4:
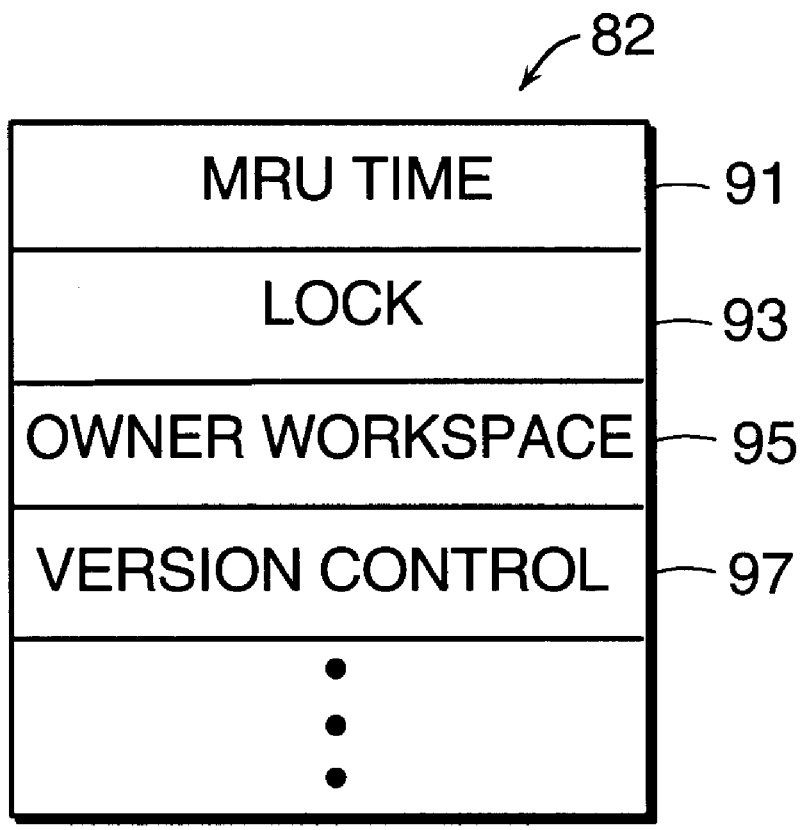
FIG. 4 is a schematic block diagram of a page control block.

FIG. 4 is a schematic block diagram of a page control block structure. Each page control block 82 includes a most-recently-used (MRU) time field 91, a lock flag 93, an owner workspace pointer 95, and a version control field 97. The page control block 82 also includes additional fields used by other components of the computer paging subsystem and which are not shown.

A user session uses the above architecture by executing paging manager code. For data to be processed by a session, the data must be retrieved from mass storage 30 and stored in a page buffer 84 in the cache 18. Once the data is retrieved, the page buffer 84 can be publicly accessed by any user session. If the data is to be modified, such as for a what-if analysis, then the data is copied to a private page buffer, leaving the original data in the public page buffer. Details of fetching data into the cache 18 will now be described in detail.

Figure 5A:
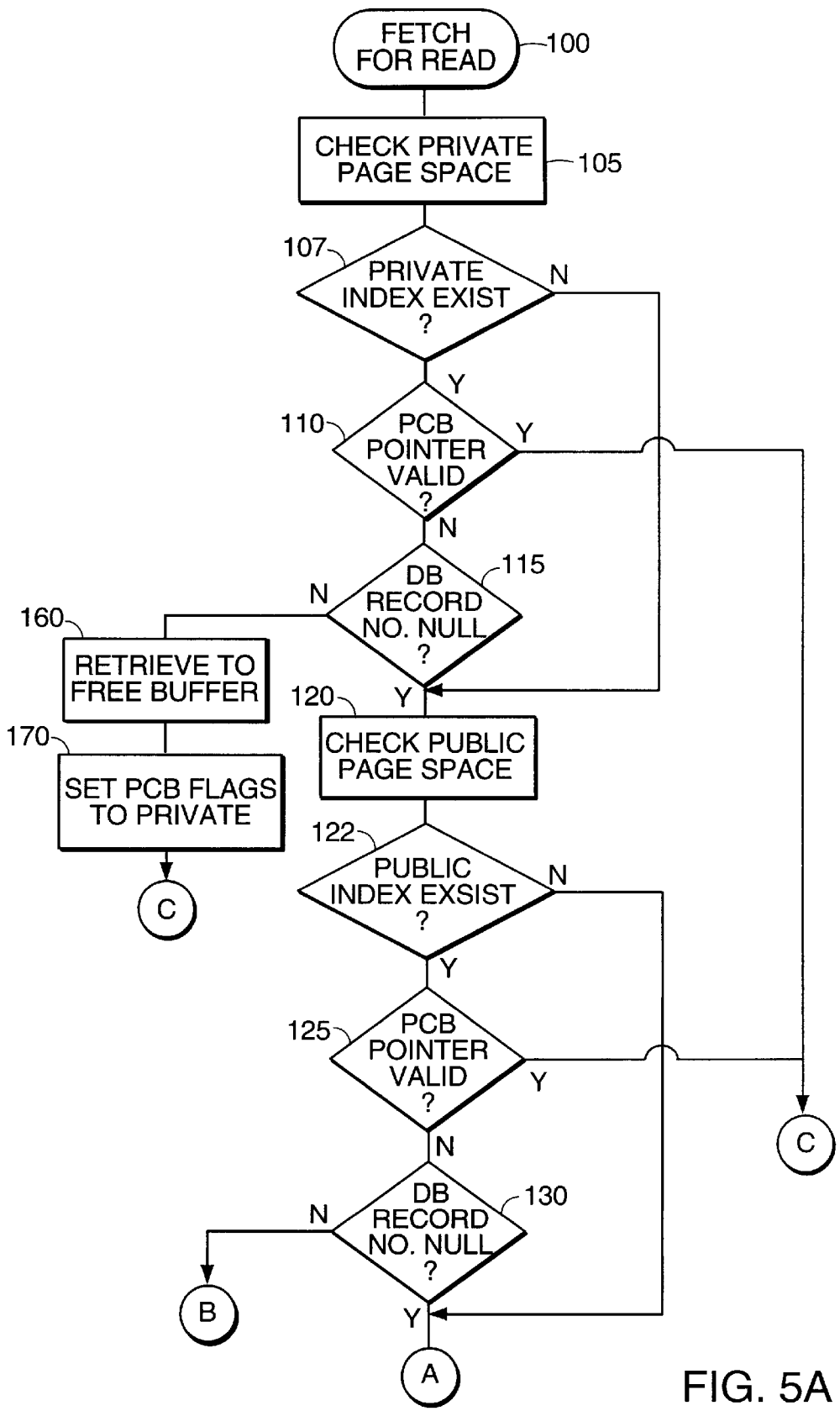
FIGS. 5A–5B illustrate a flow chart of a fetch for read operation in accordance with a preferred embodiment of the invention.
Figure 5B:
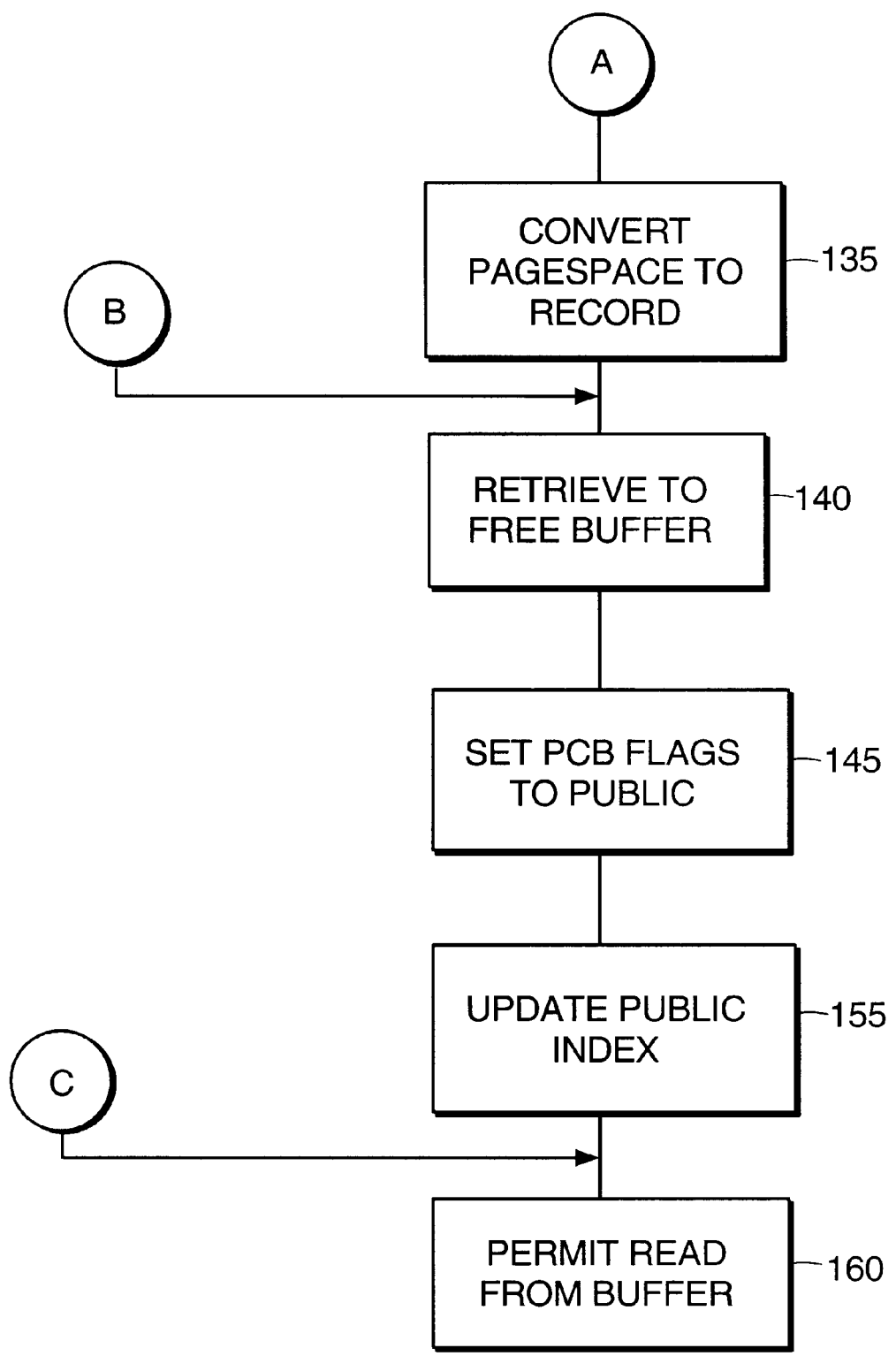

FIGS. 5A–5B illustrate a flow chart of a fetch for read operation 100 in accordance with a preferred embodiment of the invention. For a read operation, a user session thread passes, through a page transfer function 16 (FIG. 1), a pagespace handle and a page number along with a read access privilege mask. At step 105, the function attempts to check the private view for the referenced pagespace. At step 107, if a private index structure 55 does not exist for this pagespace, processing jumps to step 120 to search the global view. Otherwise, the pagespace is in the private view and processing continues to step 110.

At step 110, the private page control block pointer 58 is tested. If the private pointer 58 is valid (e.g., not null), then the page is stored in a buffer in cache memory and processing jumps to step 180. If the private pointer 58 is invalid (e.g., null), then the page is not in the cache memory 18 and processing continues to step 115.

At step 115, the private record number field 56 is compared against null. If the private record number field 56 is null, then the user does not have access to the page. If the private record number field 56 is not null, then the user session has private access to the page, but it has been written from the cache to the database 32, 34 (or a temporary database 36) on disk 30.

Where the user session does not have private access to the page (steps 107, 115), the operation checks the public view for the pagespace at step 120. At step 122, if a public index structure 65 does not exist for this pagespace, then processing jumps to step 135 to search for the database record. Otherwise, the pagespace is in the public view and processing continues to step 125.

At step 125, the public page control block pointer 68 is tested. If the public pointer 68 is valid (e.g., not null), then the page is in memory and processing jumps to step 180. If the public pointer 68 is invalid (e.g., null), then the record is not currently in cache memory and processing continues to step 130.

At step 130, the public record number field 66 is tested against null. If the public record number field 66 is null, then the page has not been loaded into memory and processing continues to step 135, where the pagespace is converted to a database record using a record map on disk for the particular database. On the other hand, if the public record number 66 is not null, then the database record is known to the paging manager. Processing now continues to step 140.

At step 140, the data is retrieved from disk to a free page buffer taken from a free buffer list (described in detail below). At step 145, the associated page control block fields are set to indicate public ownership. In particular, the owner workspace field 95 is set to null. At step 155, the public index structure 65 is updated to record the public database record number 66 and the public page control block pointer 68 is set to point to the page control block 82. Processing then continues to step 180.

Returning to step 160, because the database record had already been retrieved from storage into a private workspace, it was written to the disk 30. The private database record number field 56 identifies the location of the data on the disk, either in the database 32, 34 or in a temporary database 36. At step 160, the page is retrieved from disk storage and placed into a free page buffer from the free buffer list (described in detail below). At step 170, the page control block fields are set to indicate private ownership by setting the owner field 95 to identify the owner workspace. Processing then continues to step 180.

At step 180, the user session can locate the data in a privately accessible page buffer 82. The data is now available to be read by the user session.

Initially, a fetch for write operation is similar to the fetch for read operation. In a fetch for write operation, however, the read page is copied to another, private, page buffer.

Figure 6A:
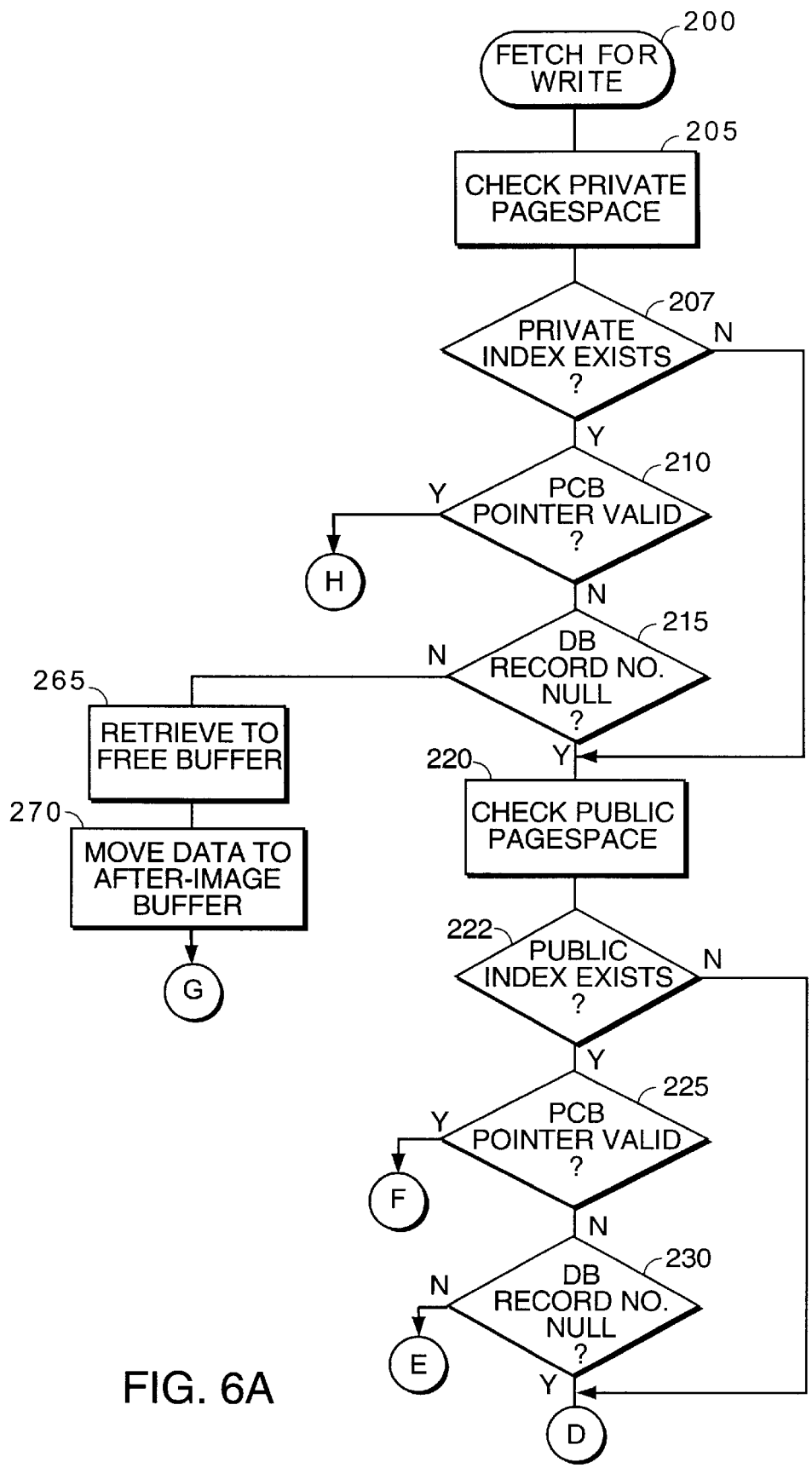
FIGS. 6A–6B illustrate a flow chart of a fetch for write operation in accordance with a preferred embodiment of the invention.
Figure 6B:
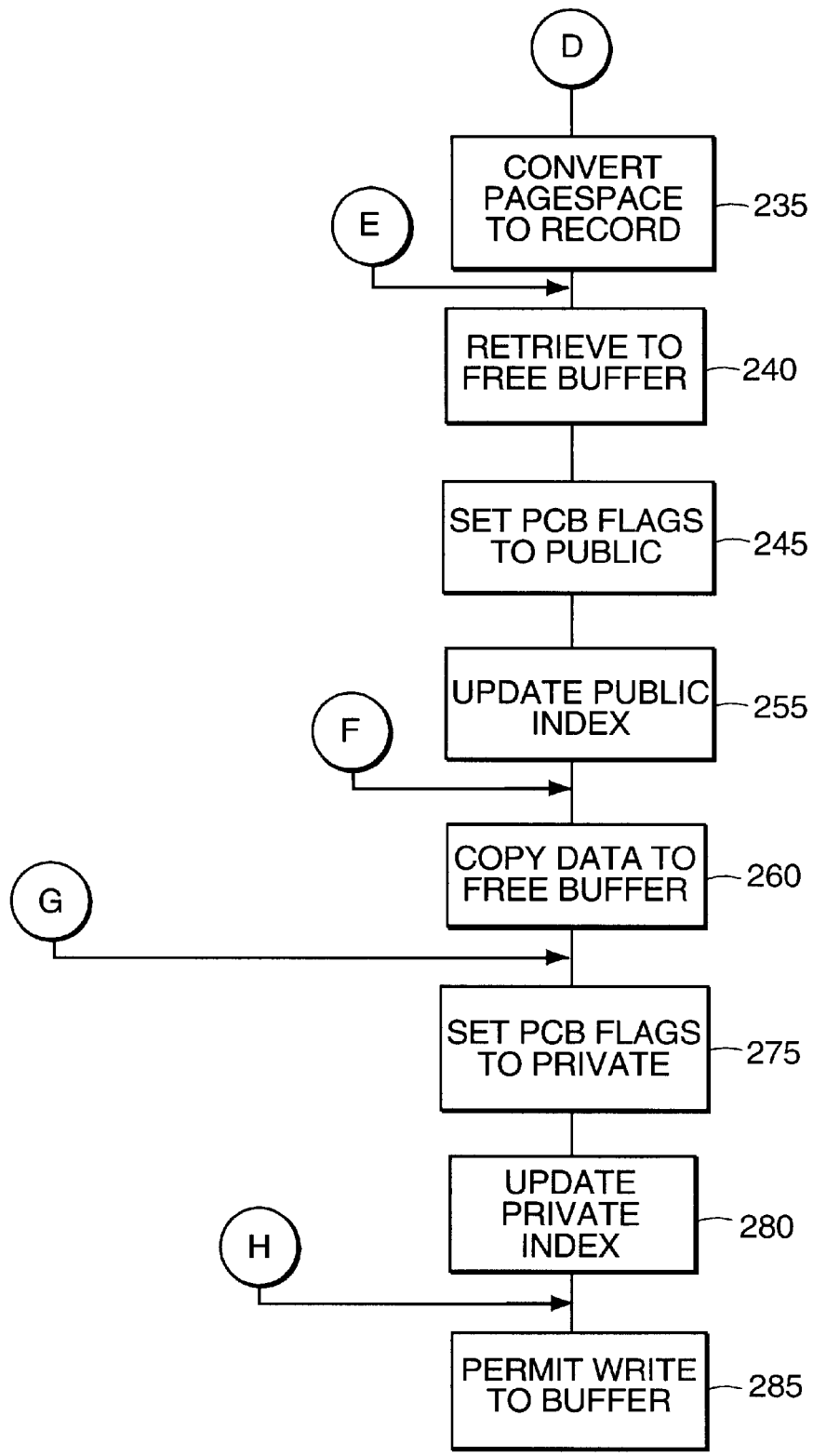

FIGS. 6A–6B illustrate a flow chart of a fetch for write operation 200 in accordance with a preferred embodiment of the invention. At step 205, the write operation 200 checks the private view for the requested pagespace. At step 207, if a private index structure 55 does not exist for this pagespace, processing jumps to step 220 to search the global view. Otherwise, the pagespace is already in the private view and processing continues to step 210.

At step 210, the private page control block pointer 58 is checked. If the private pointer 58 is valid (e.g, not null), then the page having the record has already been loaded into the cache memory 18 and is available for write access. In that case, processing jumps to step 285. On the other hand, if the private pointer 58 is invalid (e.g., null), then the page does not currently exist in the private cache memory 18 and processing continues to step 215.

At step 215, the database record number 56 is compared against null. If the record number 56 is null, then the requested page has not been loaded into memory for write access in the private view and processing continues to step 220. If the record number 56 is not null, then the page has previously been read into the cache and temporarily stored in the database 32, 34 or a temporary database 36 on disk. In that case, processing jumps to step 265.

At step 220, the public view is checked for the pagespace. At step 222, if a public index structure 65 does not exist for this pagespace, the processing jumps to step 235 to search for the database record. Otherwise, the pagespace is in the public view and processing continues to step 225.

At step 225, the public page control block pointer 68 is checked. If the public pointer 68 is valid (e.g., not null), then the page currently exists in the cache memory 18 and processing jumps to step 260. If the public pointer 68 is invalid (e.g., null), then the record is not available in the cache 18 for public access and processing continues to step 230.

At step 230, the public database record number 66 is compared against null. If the public record number field 66 is null, then the record has not previously been loaded into the cache memory 18 and processing continues to step 235 where the pagespace is converted to a database record. If the record number 66 is not null, then the data can be accessed using the stored record number and processing jumps to step 240.

At step 240, the page is retrieved from disk into a free page buffer (described in detail below). At step 245, the page control block fields are set to indicate public access. In particular, the owner workspace field 95 is set to null. At step 255, the public index data fields 66, 68 are updated to identify and point to the public page control block.

At step 260, the data from the public page buffer is copied to another free page buffer. At step 275, the page control block fields are set to indicate private ownership as described above. At step 280, the private index fields 56, 58 for the user process is updated to identify and point to this private page control block.

At step 285, the page buffer is available for write access to the user process. The user process can now continue the write operation to the privately accessible cache buffer.

As discussed above, pages retrieved from disk 30 are stored into a free page buffer 84. To facilitate this function, the paging manager maintains a list of all free page buffers 84. For example, a free list pointer can point to a linked list of page control blocks 82 associated with free page buffers 84. When the paging manager needs a free buffer, the first page control block on the free list is popped from the top of the linked list, moving the free list pointer to the next page control block in the linked list.

In accordance with a preferred embodiment of the invention, the user sessions do not directly maintain the cache memory area. Because of the particular use of pagespaces and pointers to denote page ownership, a user session requiring a new page may deadlock with another user session. In such a situation, each user session can be referencing a page which the other user session has chosen to swap from memory. To avoid such a deadlock, a separate dedicated collector thread is utilized to manage page removal from the cache memory area.

In a multi-threaded environment, user sessions can also be multi-tasked into a plurality of processing threads. In an active system, processing threads can become active in bursts, causing high page fault rates. This situation can be particularly troublesome in an OLAP system where processing threads can operate on a large amount of page data from large multi-dimensional databases. In typical prior art systems, data is either stored locally within a user process space or global page buffers are freed to satisfy the page requests. This process of freeing a global page buffer on demand before data can be retrieved from disk delays the user sessions.

To minimize processing delays which can occur when the free list becomes empty, the paging manager 15 maintains a counter of the number of entries on the free list. Every time a page control block is removed from the free list, the count is compared with a minimum threshold value. If the minimum threshold is met, then the paging manager begins a collecting operation to free up additional page buffers. The minimum threshold value is chosen based on a historical operational profile of the system to maximize the number of page buffers 84 in use while reducing the chances that there are no free page buffers at any time. For example, the minimum threshold value can be initially chosen to be 10% of the total page buffers. The minimum threshold can also be dynamically adjusted by the paging manager over time.

Figure 7A:
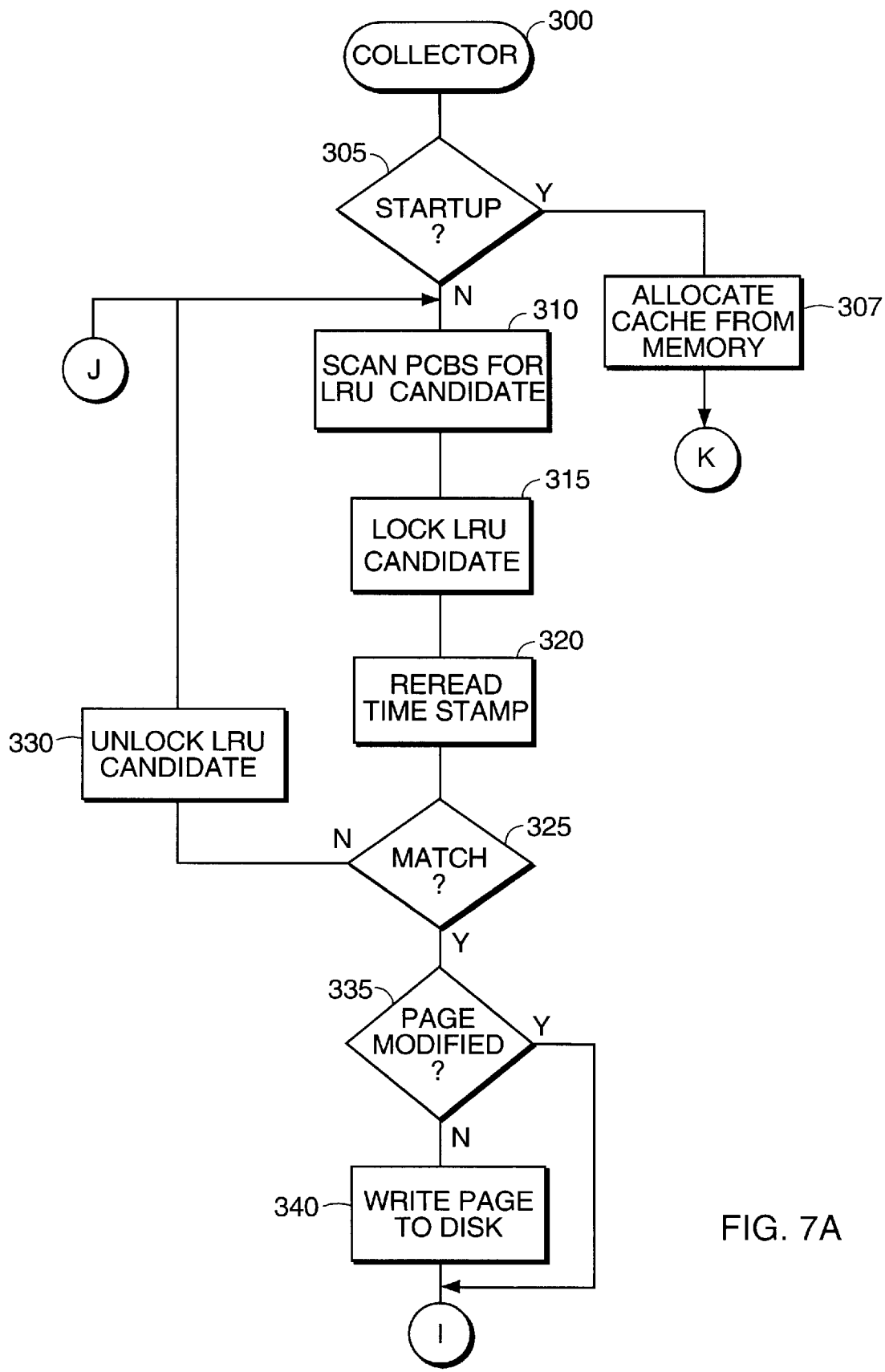
FIGS. 7A–7B illustrate a flow chart of a collector operation in accordance with a preferred embodiment of the invention.
Figure 7B:
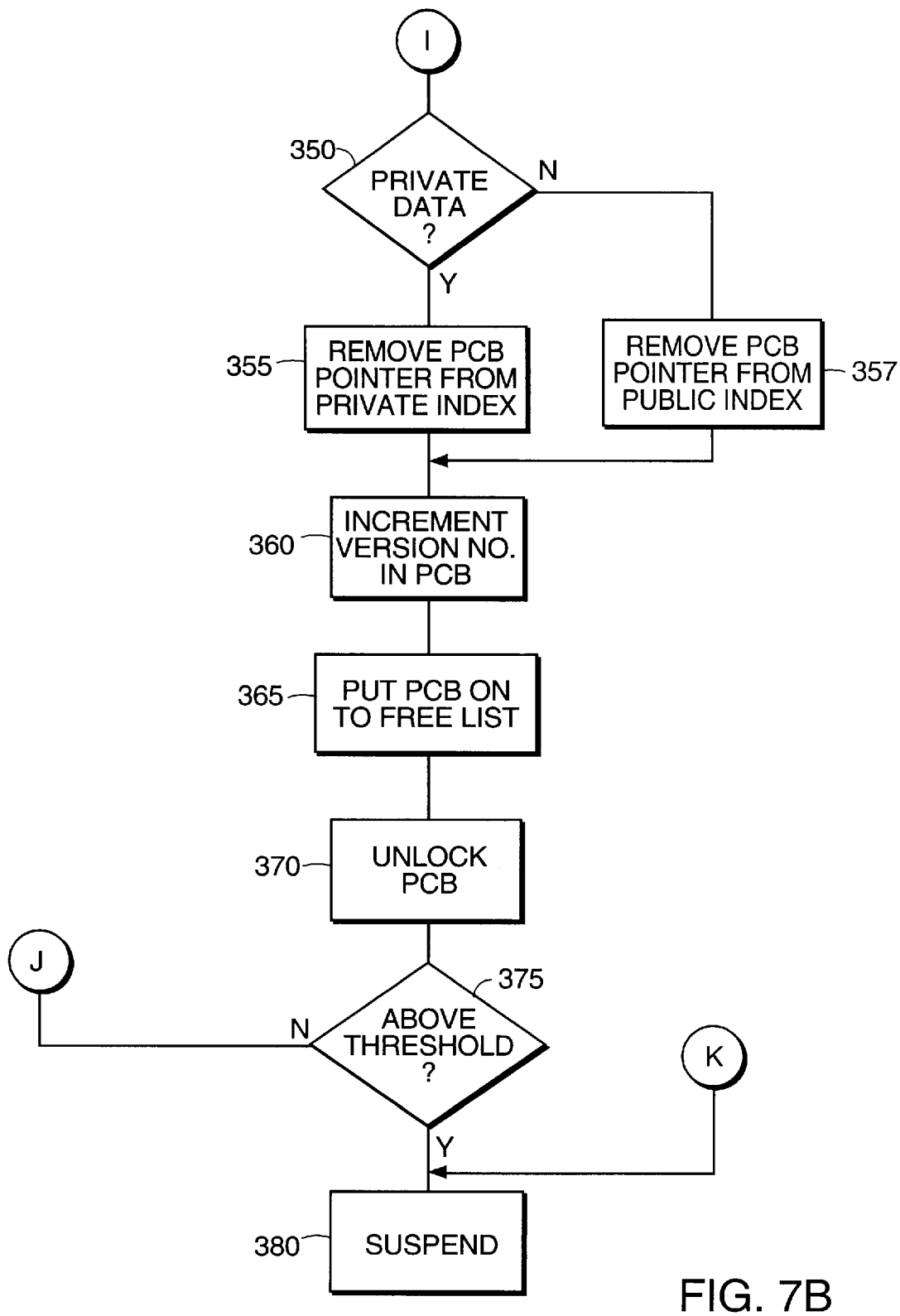

FIGS. 7A–7B illustrate a flow chart of a collecting operation 300 in accordance with the preferred embodiment of the invention. Preferably, the collector operation 300 is performed by a specialized thread in a multi-threaded environment to reduce contention and deadlock between user sessions. At step 305, the operation checks the startup condition. If a startup condition exists, then processing continues to step 307 where the collector allocates cache memory from main memory. Processing then jumps to step 380.

If this is not a startup condition, processing continues to step 310. At step 310, the collector scans the page control blocks for the least-recently-used (LRU) candidate. In particular, the collector reads the MRU time field 91 from each page control block $82_1, 82_2, \ldots, 82_x$. The page control block having the earliest MRU time, is the LRU candidate. At step 315, the collector locks the LRU candidate, thereby setting the lock field 93 in the page control block 82. At step 320, the collector rereads the MRU time field from the LRU candidate page control block. At step 325, the collector compares the original time value with the reread time value to verify that the page has not been more recently used.

If the compared time values do not match, then processing continues to step 330. At step 330, the collector unlocks the LRU candidate page control block and processing returns to step 310 to try again.

If the time values agree (step 325), then the page is confirmed as the least-recently-used page and processing continues to step 335. At step 335, the owner field 95 of the page control block 82 is checked. If the owner field 95 is set, then the page is private data to the user session identified by the owner field 95 and processing continues to step 340. At step 340, the collector causes the page buffer to be written to disk, such as an extended database 36. In particular, if an extension file needs to be created, the collector sends a message to the owner user session to do the file creation. Once the extension file exists, the collector writes to it itself. Processing then continues to step 350. If the data has not been modified (as indicated by a null (i.e., public) owner field 95), then the data is public data for read-only access. In that case, processing jumps to step 350 without rewriting the data to disk.

At step 350, a check of the owner field 95 is again made to see if the field is not null (i.e., private data). If the page is private, processing continues to step 355, where the page control block pointer is removed from the private index structure 55 by setting the private pointer 58 to null. If the page is public, processing instead continues to step 357 where the page control block pointer is removed from the public index structure 65 by setting the public pointer 68 to null.

At step 360, the version number 93 of the page in the page control block 82 is incremented. At step 365, the page control block is put onto a free list of available page control blocks. At step 370 the page control block is unlocked to make it available for re-use.

At step 375, the collector tests the number of page control blocks on the free list. If this number is above a preset maximum threshold, then processing continues to step 380. If the maximum threshold has not yet been reached, processing returns to step 310 to search for additional page control blocks to add to the free list. The maximum threshold value is preferably chosen to optimize the cache memory 18 based on past performances. For example, the maximum threshold can initially be twice the minimum threshold and can be dynamically adjusted by the paging manager.

At step 380, the collector thread suspends itself. It is awakened again when the number of page control blocks on the free list is reduced to be below the previously-described minimum threshold level. The collector is preferably awakened by a write or read operation from a user session when a page buffer is taken from the free list (FIGS. 5A–5B (140,160)); FIGS. 6A–6B (240,260,265)).

Although the collector has been described as employing an LRU algorithm, other algorithms may be more particularly suitable. For example, in systems having large caches, the computations required to determine the LRU candidate can be very time consuming. It should be recognized, however, that the function of the collector is to maintain a buffer of free page slots, even during heavy page faulting, without blocking user threads. To accomplish this function, it is recognized that the candidate page slot does not have to be storing the LRU page.

In accordance with another preferred embodiment, an "old enough" algorithm is employed to find a reclamation candidate that has not been recently used. Instead of the MRU time field 91, the collector preferably reads an internal counter field in the page control block, which can be faster to retrieve than a time field. By, for example, knowing the oldest counter value, the collector can determine a threshold counter value for those pages that are old enough to be reclaimed. Instead of looping through the entire page pool for the single LRU candidate, the collector can stop the search when finding the first page having a counter which exceeds the threshold; with the realization that this page is likely to be eventually reclaimed under the LRU algorithm anyway. By using such an "old enough" algorithm, the amount of CPU time required by the collector can be reduced to a few percent of that required for the LRU algorithm.

In an OLAP system, most data retrieved from storage is read-only data, which is easier to remove from the cache memory than modified data. Any session, however, can cause data in the cache memory to be privately modified. This data may only be used for a relatively brief period of time, but may tend to stay in the cache memory, using the server's page buffers for a private function. Although that situation is acceptable for short time periods, if left unattended much of the cache memory blocks can be allocated as private memory. In accordance with another aspect of the invention, modified pages are flushed to temporary storage when not in use. According to protocol, a page is guaranteed to be in a page buffer only if locked by a process thread. Any unlocked page is free to be flushed.

Figure 8:
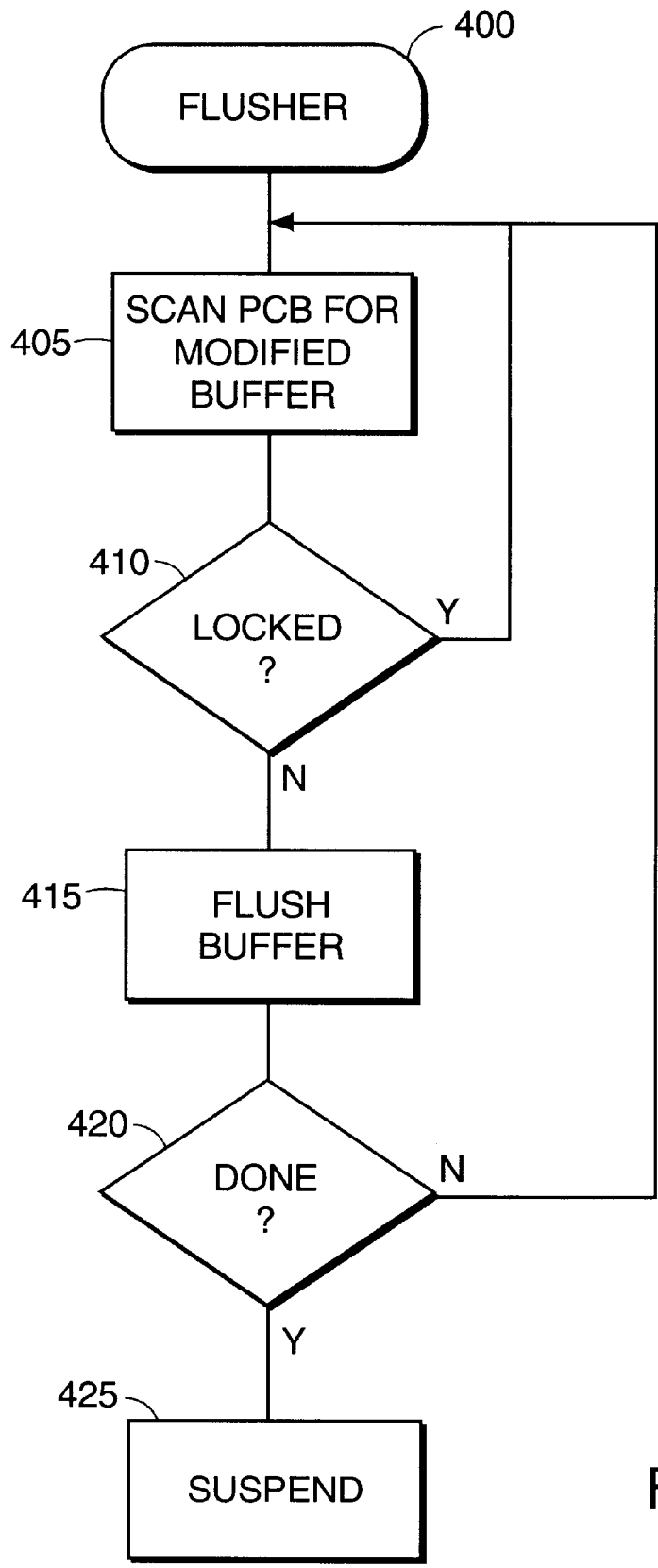
FIG. 8 illustrates a flow chart of a flusher operation in accordance with a preferred embodiment of the invention.

FIG. 8 illustrates a flow chart of a flusher operation 400 in accordance with the preferred embodiment of the invention. The flusher operation 400 is preferably performed by an independent flusher thread. Preferably, the flusher thread is activated by a periodic timer event. For example, the flusher thread can be run every 30 seconds to flush modified and unlocked pages to temporary storage from the cache memory area. In accordance with a preferred embodiment of the invention, the flusher thread is executed on one processor in a multi-processor server.

At step 405, the flusher scans the page control blocks for a modified buffer as indicated by having a set owner field 95. At step 410, the lock bit 93 of the modified buffer is checked. If the buffer is locked, processing returns to step 405 to find the next modified buffer.

If the buffer is not locked, the buffer is flushed at step 415. At step 420, the flusher checks to see if it has searched the entire cache memory area. If so, the flusher is finished and suspends itself at step 425. If the flushing task has not yet finished, processing returns to step 405.

EQUIVALENTS

While the invention has been particularly shown and described with reference to preferred embodiments thereof, it will be understood to those skilled in the art that various changes in form and detail can be made without departing from the spirit and scope of the invention as defined by the appended claims. For example, although the invention has been described with reference to particular hardware and software embodiments, it will be understood that various aspects of the invention can be embodied in either hardware, software or firmware.

These and all other equivalents are intended to be encompassed by the following claims.

The invention claimed is:

1. In a computer, a method of managing a cache memory area having a plurality of cache memory blocks, comprising:

storing data in a first subset of cache memory blocks including a shared memory block, the data in the shared memory block being accessible by a plurality of data accessor tasks;

storing a list of free cache memory blocks in the computer, the free cache memory blocks being cache memory blocks that are not included in the first subset of cache memory blocks;

satisfying a request for a cache memory block from a free cache memory block moved from the list of free cache memory blocks to the first subset of cache memory blocks;

from a data accessor task generating a triggering event in response to satisfying said request, based on the amount of free cache memory blocks;

after satisfying said request, triggering a dedicated collector task, separate from the data access tasks, to execute in the computer in response to the triggering event; and from the collector task, reclaiming memory blocks from the first subset of cache memory blocks to the list of free cache memory blocks.

2. The method of claim 1 further comprising generating the triggering event based on a minimum threshold of a plurality of free cache memory blocks in the list of free cache memory blocks.

3. The method of claim 1 wherein reclaiming includes identifying a not recently used cache memory block.

4. The method of claim 1 wherein the at least one data accessor and the collector are executed among a plurality of processing units in the computer.

5. The method of claim 1 wherein suspending the execution of the collector in task responsive to a maximum threshold of free cache memory blocks.

6. The method of claim 1 whereby reclaiming comprises communicating to an owner data accessor task that an owned cache memory block is being reclaimed.

7. The method of claim 6 further comprising instructing, from the collector task, the owner data accessor task to write data out of the owned cache memory block.

8. The method of claim 1 wherein the at least one data accessor and the collector are processing threads in a multi-threaded computer system.

9. The method of claim 1 further comprising triggering a flusher task dependent on a periodic timer event to execute in the computer to reclaim modified cache memory blocks from the first subset of cache memory blocks to the list of free cache memory blocks.

10. An apparatus for managing a cache memory area having a plurality of cache memory blocks in a computer, comprising:

a first subset of cache memory blocks having data stored therein, the data being accessible by at least one data accessor;

a list of free cache memory blocks stored in the computer, the free cache memory blocks being cache memory blocks that are not included in the first subset of cache memory blocks;

a request for a cache memory block satisfied from a free cache memory blocks to the first subset of cache memory blocks;

a triggering event generated from a data accessor task in response to satisfying said request based on the amount of free cache memory blocks; and a collector executing in the computer, after satisfying said request, in response to the triggering event, the collector reclaiming cache memory blocks from the first subset of cache memory blocks to the list of free cache memory blocks.

11. The apparatus of claim 10 wherein the triggering event comprises a minimum threshold of a plurality of free cache memory blocks in the list of free cache memory blocks.

12. The apparatus of claim 10 wherein the collector reclaims cache memory blocks by identifying a not recently used cache memory block.

13. The apparatus of claim 10 further comprising a plurality of processing units in the computer to execute the at least one data accessor and the collector.

14. The apparatus of claim 10 further comprising a maximum threshold of free cache memory blocks to suspend the execution of the collector.

15. The apparatus of claim 10 further comprises comprising a message from the collector task to an owner data accessor task that an owned cache memory block is being reclaimed.

16. The apparatus of claim 15 further comprising an instruction from the collector to the owner data accessor to write data out of the owned cache memory block.

17. The apparatus of claim 10 wherein the at least one data accessor and the collector are processing threads in a multi-threaded computer system.

18. The apparatus of claim 10 further comprising a flusher task executing in the computer dependent on a periodic timer event to reclaim modified cache memory blocks from the first subset of cache memory blocks to the list of free cache memory blocks.

19. An article of manufacture comprising:
    a computer-readable medium for use in a computer having a memory;
    a computer-implementable program recorded on the medium to manage a cache memory having a plurality of cache memory blocks, the program comprising the steps of:
        storing data in a first subset of cache memory blocks, the data being accessible by at least one data accessor;
        storing a list of free cache memory blocks in the computer, the free cache memory blocks being cache memory blocks that are not included in the first subset of cache memory blocks;
        satisfying a request for a cache memory block from a free cache memory block moved from the list of free cache memory blocks to the first subset of cache memory blocks;
        from a data accessor task generating a triggering event in response to satisfying said request, based on the amount of free cache memory blocks;
        after satisfying said request, triggering a collector to execute in the computer in response to the triggering event; and
        from the collector, reclaiming cache memory blocks from the first subset of cache memory blocks to the list of free cache memory blocks.

20. The article of claim 19 wherein the program further comprises the step of generating the triggering event based on a minimum threshold of a plurality free cache memory blocks in the list of free cache memory blocks.

21. The article of claim 19 wherein the step of reclaiming includes identifying a not recently used cache memory block.

22. The article of claim 19 wherein the at least one data accessor and the collector are programmed to execute among a plurality of processing units in the computer.

23. The article of claim 19 wherein the program further comprises the step of suspending the execution of the collector in response to a maximum threshold of free cache memory blocks.

24. The article of claim 19 whereby the step of reclaiming comprises communicating to an owner data accessor that an owned cache memory block is being reclaimed.

25. The article of claim 24 wherein the program further comprises the step of instructing, from the collector, the owner data accessor to write data out of the owned cache memory block.

26. The article of claim 19 wherein the at least one data accessor and the collector are programmed as processing threads in a multi-threaded computer system.

27. The article of claim 19 wherein the program further comprises instructions for triggering a flusher task dependent on a periodic timer event to execute in the computer to reclaim modified cache memory blocks from the first subset of cache memory blocks to the list of free cache memory blocks.

28. The method of claim 19 wherein the program further comprises instructions for determining the threshold based on a predetermined number of free cache memory blocks, the predetermined number being greater than 1.

29. The method of claim 19 wherein the program further comprises instructions for dynamically determining the threshold based on usage of the cache memory area over time.

30. The method of claim 1 wherein the collector operates to maintain a non-empty list of free cache memory blocks.

31. The apparatus of claim 11 wherein the threshold is a predetermined number of free cache memory blocks, the predetermined number being greater than 1.

32. The apparatus of claim 11 wherein the threshold is dynamically determined based on usage of the cache memory area.

33. The apparatus of claim 10 wherein the collector operates to maintain a non-empty list of free cache memory blocks.

34. The article of claim 20 wherein the program further comprises the step of determining the threshold based on a predetermined number of free cache memory blocks, the predetermined number being greater than 1.

35. The article of claim 20 wherein the program further comprises the step of dynamically determining the threshold based on usage of the cache memory area over time.

36. The article of claim 19 wherein the program further comprises the step of operating the collector to maintain a non-empty list of free cache memory blocks.

37. In a computer, a method of managing a cache memory area having a plurality of cache memory blocks, comprising:
    storing data in a first subset of cache memory blocks, the data being accessible by at least one data accessor;
    storing a list of free cache memory blocks in the computer, the free cache memory blocks being cache memory blocks that are not included in the first subset of cache memory blocks;
    from a data accessor, generating a triggering event based on the amount of free cache memory blocks;
    triggering a collector to execute n the computer in response to the triggering event; and
    from the collector, reclaiming cache memory blocks from the first subset of cache memory blocks to the list of free cache memory blocks.

38. The method of claim 37 further comprising generating the triggering event based on a minimum threshold of free cache memory blocks.

39. The method of claim 38 further comprising determining the threshold based on a predetermined number of free cache memory blocks, the predetermined number being greater than 1.

40. The method of claim 38 further comprising dynamically determining the threshold based on usage of the cache memory area over time.

41. The method of claim 37 further comprising operating the collector to maintain a non-empty list of free cache memory blocks.

42. The method of claim 37 wherein reclaiming includes identifying a not recently used cache memory block.

43. The method of claim 37 wherein the at least one data accessor and the collector are processing threads in a multi-threaded computer system.

44. The method of claim 37 further comprising suspending the execution of the collector in response to a maximum threshold of free cache memory blocks.

45. The method of claim 37 whereby reclaiming comprises communicating to an owner data accessor that an owned cache memory block is being reclaimed.

46. The method of claim 45 further comprising instructing, from the collector, the owner data accessor to write data out of the owned cache memory block.

47. The method of claim 37 wherein the at least one data accessor and the collector are executed among a plurality of processing units in the computer.

48. The method of claim 37 further comprising triggering a flusher to execute in the computer to reclaim modified cache memory blocks from the first subset of cache memory blocks.

49. An apparatus for managing a cache memory area having a plurality of cache memory blocks in a computer, comprising:
    a first subset of cache memory blocks having data stored therein, the data being accessible by at least one data accessor;
    a list of free cache memory blocks that are not included in the first subset of cache memory blocks; and
    a triggering event generated by a data accessor based on the amount of free cache memory blocks;
    a collector executing in the computer in response to the triggering event, the collector reclaiming cache memory blocks from the first subset of cache memory blocks to the list of free cache memory blocks.

50. The apparatus of claim 49 wherein the triggering event comprises a minimum threshold of free cache memory blocks.

51. The apparatus of claim 50 wherein the threshold is a predetermined number of free cache memory blocks, the predetermined number being greater than 1.

52. The apparatus of claim 50 wherein the threshold is dynamically determined based on usage of the cache memory area over time.

53. The apparatus of claim 49 wherein the collector operates to maintain a non-empty list of free cache memory blocks.

54. The apparatus of claim 49 wherein the collector reclaims cache memory blocks by identifying a not recently used cache memory block.

55. The apparatus of claim 49 further comprising a plurality of processing units in the computer to execute the at least one data accessor and the collector.

56. The apparatus of claim 49 further comprising a maximum threshold of free cache memory blocks to suspend the execution of the collector.

57. The apparatus of claim 49 further comprising a message from the collector to an owner data accessor that an owned cache memory block is being reclaimed.

58. The apparatus of claim 57 further comprising an instruction from the collector to the owner data accessor to write data out of the owned cache memory block.

59. The apparatus of claim 49 wherein the at least one data accessor and the collector are processing threads in a multi-threaded computer system.

60. The apparatus of claim 49 further comprising a flusher executing in the computer to reclaim modified cache memory blocks from the first subset of cache memory blocks to the list of free cache memory blocks.

61. An article of manufacture comprising:
    a computer-readable medium for use in a computer having a memory;
    a computer-implementable program recorded on the medium to manage a cache memory having a plurality of cache memory blocks, the program comprising:
        storing data in a first subset of cache memory blocks, the data being accessible by at least one data accessor;
        storing a list of free cache memory blocks in the computer, the free cache memory blocks being cache memory blocks that are not included in the first subset of cache memory blocks;
        from a data accessor, generating a triggering event, based on the amount of free cache memory blocks;
        triggering a collector to execute in the computer in response to the triggering event; and
        from the collector, reclaiming cache memory blocks from the first subset of cache memory blocks to the list of free cache memory blocks.

62. The article of claim 61 wherein the program further comprises instructions for generating the triggering event based on a minimum threshold of free cache memory blocks.

63. The article of claim 62 wherein the program further comprises instructions for determining the threshold based on a predetermined number of free cache memory blocks, the predetermined number being greater than 1.

64. The article of claim 62 wherein the program further comprises instructions for dynamically determining the threshold based on usage of the cache memory area over time.

65. The article of claim 61 wherein the program further comprises instructions for operating the collector to maintain a non-empty list of free cache memory blocks.

66. The article of claim 61 wherein the instructions for reclaiming includes identifying a not recently used cache memory block.

67. The article of claim 61 wherein the at least one data accessor and the collector are programmed to execute among a plurality of processing units in the computer.

68. The article of claim 61 wherein the program further comprises instructions for suspending the execution of the collector in response to a maximum threshold of free cache memory blocks.

69. The article of claim 61 whereby the instructions for reclaiming comprises communicating to an owner data accessor that an owned cache memory block is being reclaimed.

70. The article of claim 69 wherein the program further comprises instructions for instructing, from the collector, the owner data accessor to write data out of the owned cache memory block.

71. The article of claim 61 wherein the at least one data accessor and the collector are programmed as processing threads in a multi-threaded computer system.

72. The article of claim 61 wherein the program further comprises instructions for triggering a flusher to execute in the computer to reclaim modified cache memory blocks from the first subset of cache memory blocks to the list of free cache memory blocks.

73. In a computer, a method of managing a cache memory area having a plurality of cache memory blocks, comprising:
   storing data in a first subset of cache memory blocks, the data being accessible by at least one data accessor;
   storing a list of free cache memory blocks in the computer, the free cache memory blocks being cache memory blocks that are not included in the first subset of cache memory blocks;
   triggering a collector to execute in the computer in response to a triggering event; and
   from the collector, reclaiming cache memory blocks from the first subset of cache memory blocks to the list of free cache memory blocks, wherein an owner data accessor is informed that an owned cache memory block is being reclaimed.

74. The method of claim 73 further comprising generating the triggering event based on a minimum threshold of free cache memory blocks.

75. The method of claim 74 further comprising determining the threshold based on a predetermined number of free cache memory blocks, the predetermined number being greater than 1.

76. The method of claim 74 further comprising dynamically determining the threshold based on usage of the cache memory area over time.

77. The method of claim 73 further comprising operating the collector to maintain a non-empty list of free cache memory blocks.

78. The method of claim 73 wherein reclaiming includes identifying a not recently used cache memory block.

79. The method of claim 73 wherein the at least one data accessor and the collector are executed among a plurality of processing units in the computer.

80. The method of claim 73 further comprising suspending the execution of the collector in response to a maximum threshold of free cache memory blocks.

81. The method of claim 73 further comprising instructing, from the collector, the owner data accessor to write data out of the owned cache memory block.

82. The method of claim 73 wherein the at least one data accessor and the collector are processing threads in a multi-threaded computer system.

83. The method of claim 73 further comprising triggering a flusher to execute in the computer to reclaim modified cache memory blocks from the first subset of cache memory blocks to the list of free cache memory blocks.

84. An apparatus for managing a cache memory area having a plurality of cache memory blocks in a computer, comprising:
   a first subset of cache memory blocks having data stored therein, the data being accessible by at least one data accessor;
   a list of free cache memory blocks stored in the computer, the free cache memory blocks being cache memory blocks that are not included in the first subset of cache memory blocks; and
   a collector executing in the computer in response to a triggering event, the collector reclaiming cache memory blocks from the first subset of cache memory blocks to the list of free cache memory blocks, wherein an owner data accessor is informed that an owned cache memory block is being reclaimed.

85. The apparatus of claim 84 wherein the triggering event comprises a minimum threshold of free cache memory blocks.

86. The apparatus of claim 85 wherein the threshold is a predetermined number of free cache memory blocks, the predetermined number being greater than 1.

87. The apparatus of claim 85 wherein the threshold is dynamically determined based on usage of the cache memory area over time.

88. The apparatus of claim 84 wherein the collector operates to maintain a non-empty list of free cache memory blocks.

89. The apparatus of claim 84 wherein the collector reclaims cache memory blocks by identifying a not recently used cache memory block.

90. The apparatus of claim 84 further comprising a plurality of processing units in the computer to execute the at least one data accessor and the collector.

91. The apparatus of claim 84 further comprising a maximum threshold of free cache memory blocks to suspend the execution of the collector.

92. The apparatus of claim 84 further comprising an instruction from the collector to the owner data accessor to write data out of the owned cache memory block.

93. The apparatus of claim 84 wherein the at least one data accessor and the collector are processing threads in a multi-threaded computer system.

94. The apparatus of claim 84 further comprising a flusher executing in the computer to reclaim modified cache memory blocks from the first subset of cache memory blocks to the list of free cache memory blocks.

95. An article of manufacture comprising:
   a computer-readable medium for use in a computer having a memory;
   a computer-implementable program recorded on the medium to manage a cache memory having a plurality of cache memory blocks, the program comprising instructions for:
      storing data in a first subset of cache memory blocks, the data being accessible by at least one data accessor;
      storing a list of free cache memory blocks in the computer, the free cache memory blocks being cache memory blocks that are not included in the first subset of cache memory blocks;
      triggering a collector to execute in the computer in response to a triggering event; and
      from the collector, reclaiming cache memory blocks from the first subset of cache memory blocks to the list of free cache memory blocks, wherein an owner data accessor is informed that an owned cache memory block is being reclaimed.

96. The article of claim 95 wherein the program further comprises instructions for generating the triggering event based on a minimum threshold of free cache memory blocks.

97. The article of claim 96 wherein the program further comprises instructions for determining the threshold based on a predetermined number of free cache memory blocks, the predetermined number being greater than 1.

98. The article of claim 96 wherein the program further comprises instructions for dynamically determining the threshold based on usage of the cache memory area over time.

99. The article of claim 95 wherein the program further comprises instructions for operating the collector to maintain a non-empty list of free cache memory blocks.

100. The article of claim 95 wherein the instructions for reclaiming includes identifying a not recently used cache memory block.

101. The article of claim 95 wherein the at least one data accessor and the collector are programmed to execute among a plurality of processing units in the computer.

102. The article of claim 95 wherein the program further comprises instructions for suspending the execution of the collector in response to a maximum threshold of free cache memory blocks.

103. The article of claim 95 wherein the program further comprises instructions for instructing, from the collector, the owner data accessor to write data out of the owned cache memory block.

104. The article of claim 95 wherein the at least one data accessor and the collector are programmed as processing threads in a multi-threaded computer system.

105. The article of claim 95 wherein the program further comprises instructions for triggering a flusher to execute In the computer to reclaim modified cache memory blocks from the first subset of cache memory blocks to the list of free cache memory blocks.

* * * * *